United States Patent [19]

Matsuda et al.

[11] Patent Number: 5,317,548
[45] Date of Patent: May 31, 1994

[54] REDUCED HEIGHT MAGNETIC BIAS APPARATUS FOR A MAGNETOOPTICAL DISK DRIVE INCLUDING A COIL MEANS HAVING A CENTRAL AXIS PERPENDICULAR TO THE ROTATING AXIS OF A ROTATABLE MAGNET

[75] Inventors: Nobuhide Matsuda, Hirakara; Motoki Kuroda, Neyagawa, both of Japan

[73] Assignee: Matsushita Electric Industrial Co., Ltd., Kadoma, Japan

[21] Appl. No.: 99,763

[22] Filed: Jul. 29, 1993

Related U.S. Application Data

[63] Continuation of Ser. No. 623,301, Dec. 4, 1990, abandoned.

[30] Foreign Application Priority Data

Dec. 6, 1989 [JP] Japan .................................. 1-316846
Sep. 10, 1990 [JP] Japan .................................. 2-240814

[51] Int. Cl.[5] ...................... G11B 13/04; G11B 11/12; G11B 11/10
[52] U.S. Cl. .......................................... 369/13; 360/59; 360/66; 360/114
[58] Field of Search ....................... 369/13; 360/59, 66, 360/114; 361/139, 143–147; 365/122

[56] References Cited

U.S. PATENT DOCUMENTS

| | | | |
|---|---|---|---|
| 4,701,895 | 10/1987 | VanSant | 369/13 |
| 4,748,606 | 5/1988 | Naito et al. | 360/59 |
| 4,962,492 | 10/1990 | Mathildus et al. | 369/13 |
| 4,972,337 | 11/1990 | Eguchi et al. | 369/13 |
| 4,984,224 | 1/1991 | Tsuyuguchi et al. | |

FOREIGN PATENT DOCUMENTS 60-175201  9/1985  Japan .................................. 369/13

OTHER PUBLICATIONS

Copy of European Patent Office Search Report for Application 90 12 3348.

Primary Examiner—Hoa T. Nguyen
Attorney, Agent, or Firm—Ratner & Prestia

[57] ABSTRACT

A magnetic bias apparatus for generating a magnetic field for recording or erasing information in the magnetooptical disk drive apparatus is disclosed. The magnetic bias apparatus has a permanent magnet for generating a bias magnetic field which is rotatable about a rotating axis, a coil for rotating the permanent magnet and a circuit for driving the coil. The central axis of the coil is directed toward the rotating axis parallel to the plane of a magnetoptical disk and perpendicular to a plane of the permanent magnet defined by the two poles and extending through the central axis. The apparatus can be constructed in a reduced height while the permanent magnet can be rapidly rotated.

5 Claims, 6 Drawing Sheets (AXIS OF COIL 4)

REDUCED HEIGHT MAGNETIC BIAS APPARATUS FOR A MAGNETOOPTICAL DISK DRIVE INCLUDING A COIL MEANS HAVING A CENTRAL AXIS PERPENDICULAR TO THE ROTATING AXIS OF A ROTATABLE MAGNET

This application is a continuation of application Ser. No. 07/623,301 filed Dec. 4, 1990, now abandoned.

BACKGROUND OF THE INVENTION

1. Field of the Invention

This invention relates to a magnetic bias apparatus for a magnetooptical disk drive apparatus in which information is recorded on and erased from a recording medium using the magnetooptical effect.

2. Description of the Prior Art

The technique of magnetooptically recording information on a recording medium such as a disk has drawn great attention. A magnetooptical recording apparatus using this technique is provided with a magnetic bias apparatus which is disposed in a position opposite to an optical head.

FIG. 11 diagrammatically recording apparatus. The prior art magnetooptical recording apparatus. The apparatus of FIG. 11 comprises a motor 1a for rotating a magnetooptical disk 1, an optical head 2, and a magnetic bias apparatus A which faces the optical head 2 through the disk 1. The optical head 2 includes an object lens 2a, and a semiconductor laser device (not shown). The magnetic bias apparatus A has a permanent magnet 3, and a coil 4 which is arranged above the magnet 3 (i.e., above the N-pole of the magnet). The magnet 3 is rotatable about an axis 3a. When data erasing is performed. The S-pole of the magnet 3 is directed as shown in FIG. 11 to face the disk 1 so as to produce a magnetic field of a predetermined direction, and a light beam emitted from the optical head 2 is converged onto the disk 1, thereby erasing data stored on the disk 1. When data is to be recorded on the disk 1, the coil 4 is driven to rotate the magnet 3 about the axis 3a by a half turn, so that the N-pole faces the disk 1 and a magnetic field of a direction opposite to the predetermined direction is applied to the disk 1. Then, a light beam modulated in accordance with the data to be recorded is converged onto the disk 1 to record the data on the disk. Alternatively, the relationships of the directions of the magnetic fields may be inverted, in other words, the magnet 3 may be positioned so that when data is to be erased the N-pole faces the disk 1 and when data is to be recorded the S-pole faces the disk 1.

It is desirable that a magnetooptical recording apparatus should be as small and as thin as possible. For this reason, it is necessary for a magnetic bias apparatus also to be made as thin as possible. In an apparatus having the structure shown in FIG. 11, the coil 4 for reversing the direction of the magnetic field is positioned above the permanent magnet 3, and therefore the magnetic bias apparatus cannot be thinly constructed.

FIG. 12 illustrates another magnetic bias apparatus. In the apparatus shown in FIG. 12, the coil 4 and the permanent magnet 3 are juxtaposed in parallel so that the overall height of the apparatus can be decreased. Although the apparatus shown in FIG. 12 can solve the above-mentioned problem, it has another problem in that the coil 4 generates the magnetic flux as shown in FIG. 12, and therefore the rotating force f which is caused by the magnetic field of the coil 4 and acts on the magnet 3 is extremely small, resulting in that a significant amount of time is required for rotating the magnet 3 or the response characteristic of the magnetic bias apparatus is poor.

SUMMARY OF THE INVENTION

The magnetic bias apparatus for a magnetooptical disk drive apparatus of this invention, which overcomes the above-discussed and numerous other disadvantages and deficiencies of the prior art, comprises: a permanent magnet for generating a bias magnetic field, said permanent magnet being rotatable about a rotating axis; a coil for rotating said permanent magnet; and drive means for driving said coil, the central axis of said coil is directed toward said rotating axis and perpendicular to the line connecting both the two poles of said permanent magnet.

In preferred embodiments, a body of a ferromagnetic material is disposed at the center of said coil.

In preferred embodiments, the length of said body is smaller than the length of said coil along said central axis.

In preferred embodiments, said body is a substantially rectangular body.

In preferred embodiments, one of the surfaces of said body faces said permanent magnet.

In preferred embodiments, said one surface is a curved one which is concaved in the direction along said central axis and departing from said rotating axis of said permanent magnet.

Thus, the invention described herein makes possible the objectives of:

(1) providing a magnetic bias apparatus in which the magnetic flux for rotating the permanent magnet can be effectively applied to the permanent magnet;

(2) providing a magnetic bias apparatus in which the permanent magnet can be rapidly rotated;

(3) providing a magnetic bias apparatus which can be constructed in a reduced height or thickness; and (4) providing a magnetic bias apparatus which is low in height or small in thickness while the permanent magnet can be rapidly rotated.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
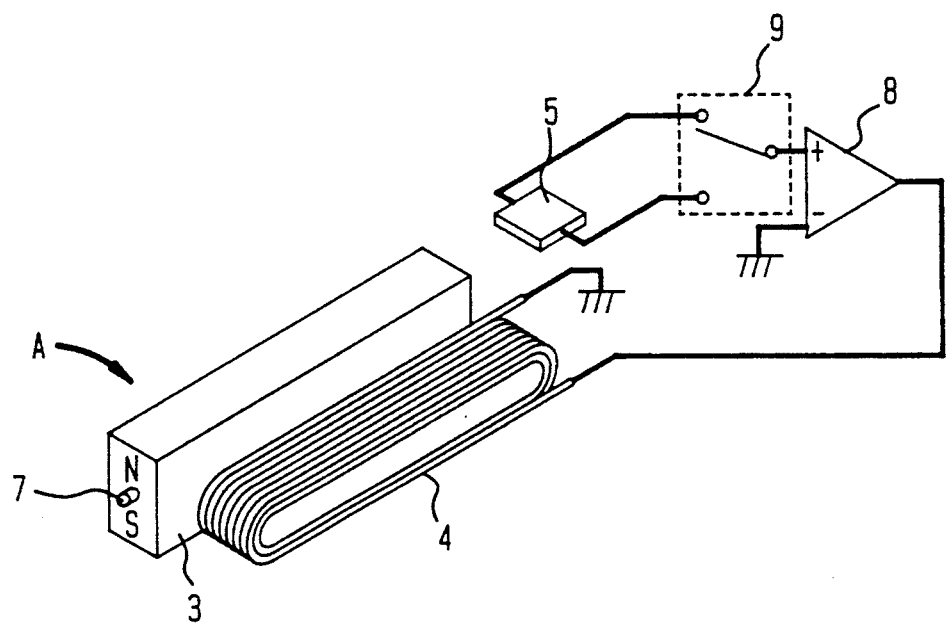
FIG. 1 is a perspective view diagrammatically illustrating a magnetic bias apparatus according to the invention.

FIG. 1 shows an embodiment of this invention. The magnetic bias apparatus A of this embodiment comprises a permanent magnet 3 for generating a magnetic field, a coil 4 for rotating the permanent magnet 3. The permanent magnet 3 is rotatable about an axis 7 which is supported by an adequate supporting means (not shown). The apparatus A further comprises a driving circuit 8 for driving the coil 4, a magnetic detector 5 which detects the direction and strength of the magnetic field, and a changeover switch 9 by which the polarity of the voltage applied to the coil 4 is inverted in accordance with the output of the magnetic detector 5. The magnetic detector 5 detects the position or rotating angle of the permanent magnet 3, and in accordance with the degree of the detected rotating angle outputs a signal to the driving circuit 8, so that the amount and direction of the current flowing the coil 4 are controlled, thereby controlling the position or rotating angle of the permanent magnet 3. More specifically, the magnetic detector 5 outputs a voltage which corresponds to the strength of the magnetic field generated by the permanent magnet 3, and the output voltage is coupled to the driving circuit 8. The driving circuit 8 supplies a voltage for driving the coil 4 to rotate the permanent magnet 3 so that the poles of the magnet 3 are positioned at a desired positional relationship. In this embodiment, the coil 4 is a cylindrical coil. The axis Y of the coil 4 is directed toward the axis 7 of the permanent magnet 3, and is perpendicular to the line (Z in FIG. 5) connecting the N- and S-poles of the permanent magnet 3 when the magnet 3 is at either of the recording position or the erasing position.

Figure 2:
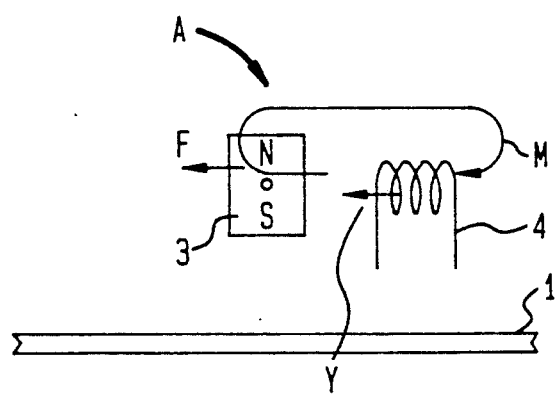
FIG. 2 is a diagram illustrating the operation of the apparatus of FIG. 1.

When the permanent magnet 3 is to be inverted or rotated, the switch 9 is set to the position for supplying a current of the direction by which a magnetic field of the direction as indicated by an arrow M in FIG. 2 is generated, and the coil 4 is driven by the current. In this situation, since the coil 4 is positioned in the manner described above, the direction of the force F caused by the magnetic field M of the coil 4 and applied to the magnet 3 coincides with the rotating direction of the magnet 3 at the initial stage of the rotation, whereby the force F is effectively applied to the magnet 3. According to this embodiment, therefore, the rapid inversion of the permanent magnet 3 can be achieved, and an efficient magnetic bias apparatus is obtained.

Figure 3:
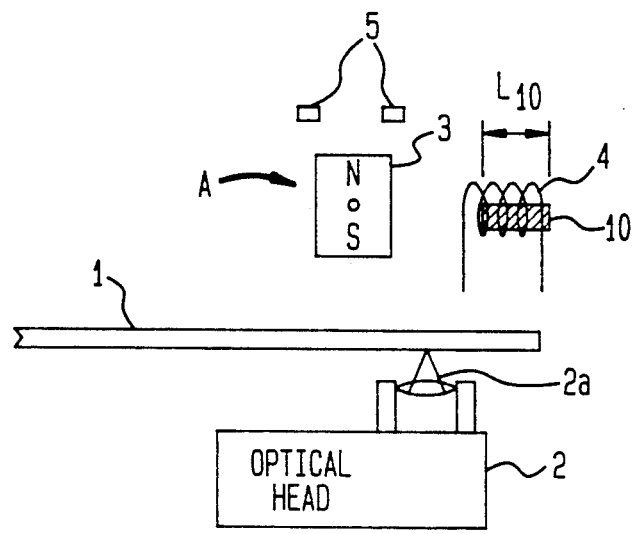
FIG. 3 is a diagram illustrating another apparatus according to the invention.
Figure 4:
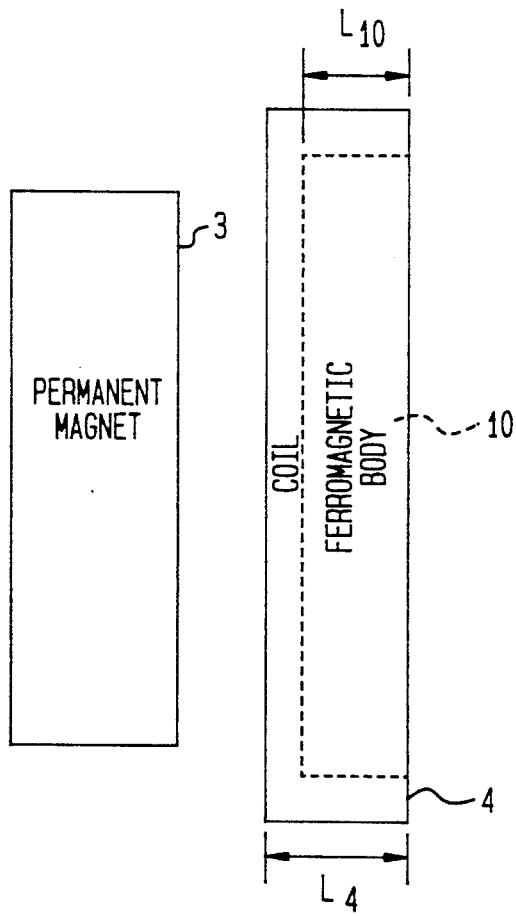
FIG. 4 is a plan view illustrating the arrangement of the apparatus of FIG. 3.

FIG. 3 diagrammatically illustrates another embodiment of the invention. This embodiment is constructed in the same manner as that shown in FIG. 1 except that a body 10 having a rectangular section and made of a ferromagnetic material such as iron is fixedly positioned at the vicinity of the center of the coil 4. FIG. 4 shows the positional relationship between the coil 4 and the ferromagnetic body 10. As shown in FIG. 4, the length $L_{10}$ of the ferromagnetic body 10 along the axis Y is smaller than the length $L_4$ of the coil 4 (in this embodiment, $L_{10} = (\frac{2}{3}) \times L_4$). In the apparatus of this embodiment, when the magnetic field M (FIG. 2) is generated by the coil 4, the ferromagnetic body 10 is magnetized by the magnetic field M. The existence of the magnetized ferromagnetic body 10 contributes to the further increase of the strength of the force F.

Figure 6:
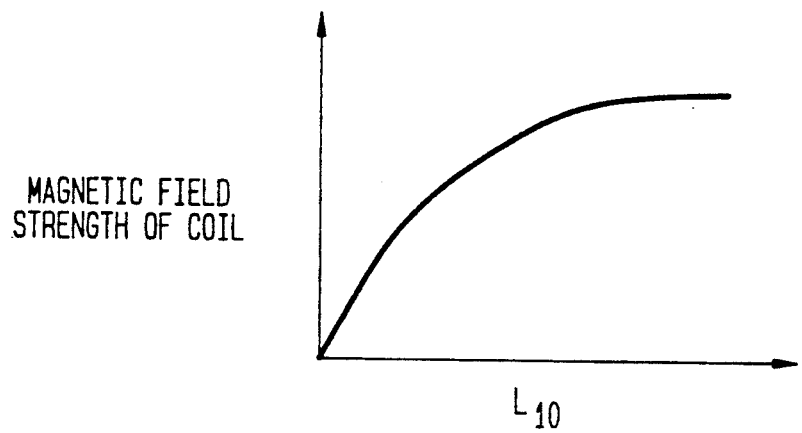
FIG. 6 illustrates the relationship between the length of the ferromagnetic body and the strength of the magnetic field produced by the coil in the apparatus of FIG. 3.
Figure 7:
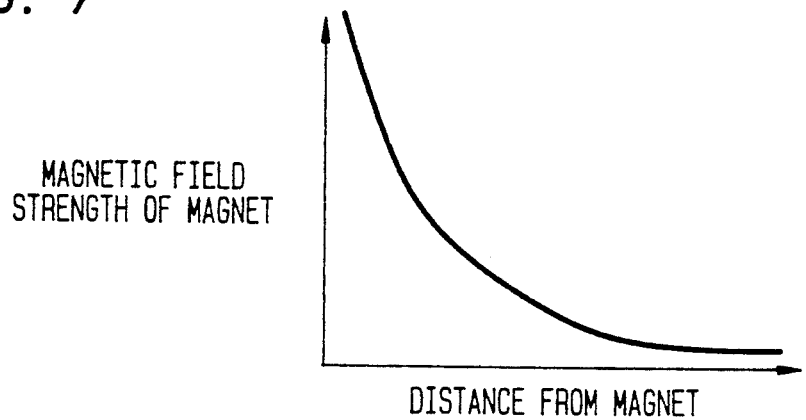
FIG. 7 illustrates the change of the strength of the magnetic field produced by the permanent magnet with the increase of the distance from the permanent magnet in the apparatus of FIG. 3.
Figure 8:
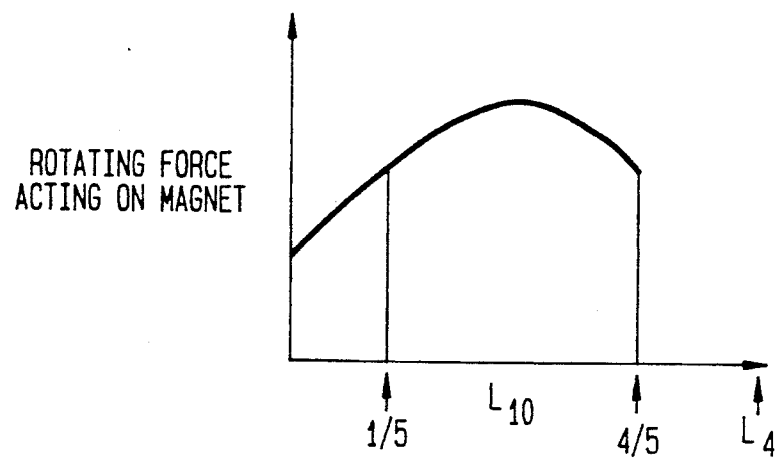
FIG. 8 illustrates the relationship between the length of the ferromagnetic body and the strength of the force in the apparatus of FIG. 3.

FIG. 6 illustrates the relationship between the length $L_{10}$ of the ferromagnetic body 10 and the strength of the magnetic field produced by the coil 4. FIG. 7 illustrates the change of the strength of the magnetic field produced by the permanent magnet 3 with the increase of the distance from the magnet. FIG. 8 illustrates the relationship between the length $L_{10}$ of the ferromagnetic body 10 and the strength of the force F. As seen from FIG. 6, the larger the length $L_{10}$ of the ferromagnetic body 10, the greater the strength of the magnetic field produced by the coil 4 becomes. As FIG. 7 shows, however, the closer to the permanent magnet 3, the greater the strength of the magnetic field produced by the permanent magnet 3 becomes. When the ferromagnetic body 10 is excess in size, therefore, it may be drawn to the permanent magnet 3. Preferably, therefore, the length $L_{10}$ of the ferromagnetic body 10 is set to be from about 1/5 to about 4/5 of the length $L_4$ of the coil 4.

Figure 5:
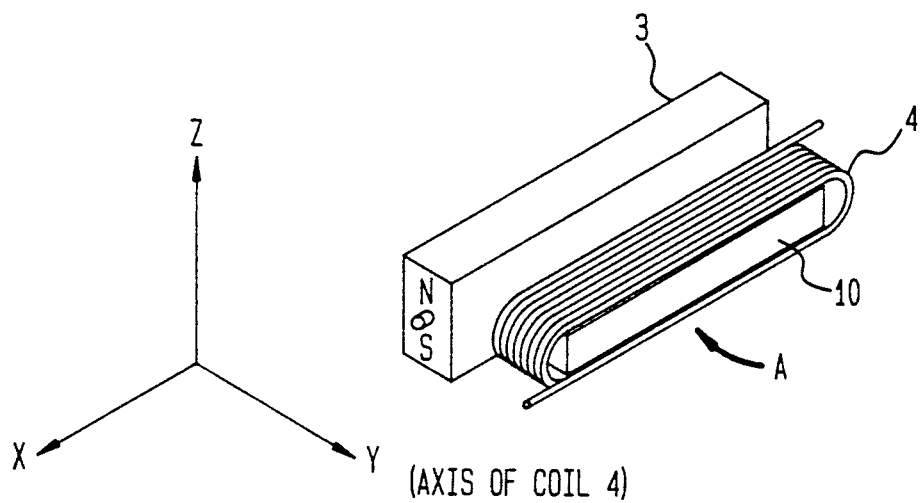
FIG. 5 is a perspective view illustrating the arrangement of the apparatus of FIG. 3.
Figure 9:
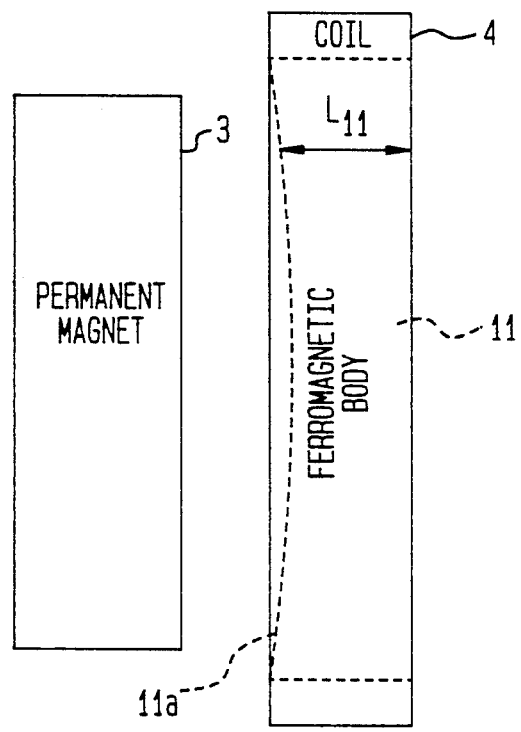
FIG. 9 is a plan view illustrating the arrangement of a further apparatus according to the invention.
Figure 10:
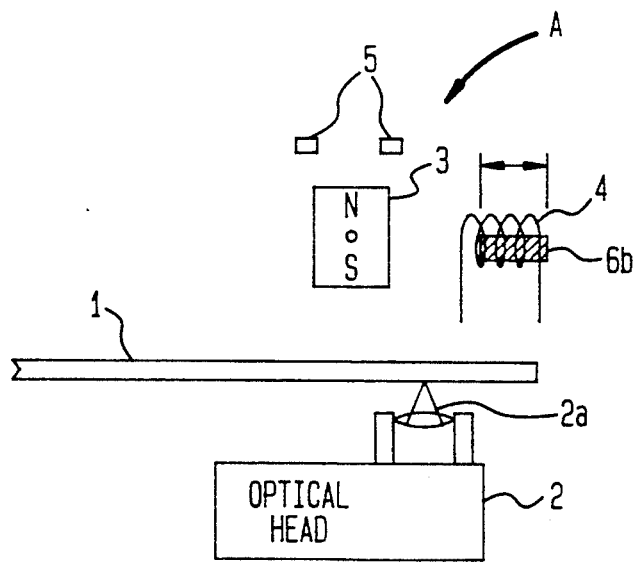
FIG. 10 is a diagram illustrating the embodiment shown in FIG. 9.
Figure 11:
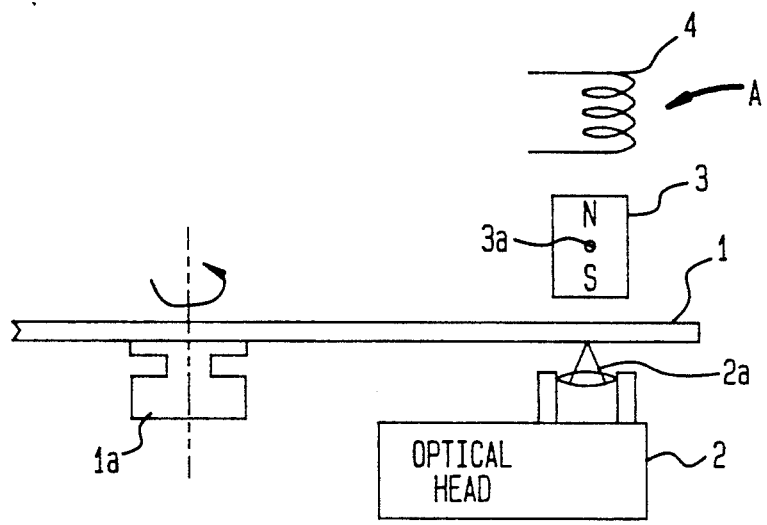
FIG. 11 is a diagram illustrating a conventional apparatus.
Figure 12:
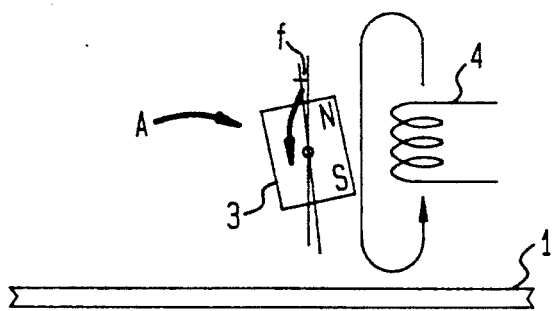
FIG. 12 is a diagram illustrating another conventional apparatus.

FIG. 9 shows a ferromagnetic body 11 used in another embodiment of the invention. As shown in FIG. 10, the ferromagnetic body 11 is fixedly positioned at the vicinity of the center of the coil 4, in the same manner as the embodiment of FIG. 3. The surface 11a of the ferromagnetic body 11 which faces the permanent magnet 3 is curved or concaved in the direction opposite to the permanent magnet 3. In other words, the length $L_{11}$ is gradually decreased, and has the minimum value at the center in the direction X (FIG. 5). Since the strength of the magnetic field generated by the permanent magnet 3 reaches the maximum in the vicinity of the center in the direction X and is gradually decreased toward both ends, the influence on the ferromagnetic body 11 from the magnetic field generated by the permanent magnet 3 is made uniform, and thus the number of the magnetic flux can be increased or the force F (FIG. 2) can be multiplied, as compared with the embodiment shown in FIG. 3.

As mentioned above, the magnetic bias apparatus according to the invention is able to achieve high speed reversing of the magnetic field with a simple construction, and is suitable for a small and thin magnetooptical disk drive apparatus.

Furthermore, because the magnetic flux is used efficiently in the magnetic bias apparatus according to the invention, the amount of the current supplied to the coil can be reduced, with the result of the reduced electric power consumption. Hence, the present apparatus is very useful also in the view point of the electric power saving.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A magnetic biasing apparatus for use in a magnetooptical disk drive apparatus, said magnetic biasing apparatus being positioned adjacent to a magnetooptical disk generally opposite an optical head means, and said magnetic biasing apparatus comprising:

a permanent magnet being rotatable about a rotating axis extended along the length of said permanent magnet, said permanent magnet having north and south poles extended in the direction perpendicular to the rotating axis;

rotating means for rotating said permanent magnet, said rotating means consisting of only a single coil displaced adjacent to said permanent magnet so that said permanent magnet is positioned outside said coil, and said rotating means is oriented such that the central axis of said coil is perpendicular to a line connecting said north and south poles of said permanent magnet, the central axis of said coil is parallel to said magnetooptical disc; and drive means for controllably driving said rotating means to produce a magnetic field.

2. An apparatus according to claim 1, wherein said rotating means further includes a ferromagnetic material disposed inside and at the center of said coil, said ferromagnetic material adapted to increase a force caused by said magnetic field.

3. An apparatus according to claim 2, wherein the length of said ferromagnetic material is smaller than the length of said coil along said central axis.

4. An apparatus according to claim 2, wherein said ferromagnetic material is a substantially rectangular body.

5. An apparatus according to claim 2, said ferromagnetic material having a concave surface facing said permanent magnet.

* * * * *